United States Patent
Krichevsky et al.

(10) Patent No.: US 9,111,558 B1
(45) Date of Patent: Aug. 18, 2015

(54) SYSTEM AND METHOD OF DIFFRACTIVE FOCUSING OF LIGHT IN A WAVEGUIDE

(71) Applicant: Western Digital (Fremont), LLC, Fremont, CA (US)

(72) Inventors: Alexander Krichevsky, Cupertino, CA (US); David Michael Owen McCloskey, Dublin (IE); Frank D. Bello, Berkeley, CA (US); Christopher B. Wolf, San Jose, CA (US)

(73) Assignees: Western Digital (Fremont), LLC, Fremont, CA (US); The Provost, Fellows, Foundation Scholars and the other members of Board, of the College of the Holy and Undivided Trinity of Queen Elizabeth near Dublin, Dublin (IE)

( * ) Notice: Subject to any disclaimer, the term of this patent is extended or adjusted under 35 U.S.C. 154(b) by 0 days.

(21) Appl. No.: 14/279,654

(22) Filed: May 16, 2014

Related U.S. Application Data

(60) Provisional application No. 61/953,564, filed on Mar. 14, 2014.

(51) Int. Cl.
| G11B 11/00 | (2006.01) |
| G11B 5/48 | (2006.01) |
| G02B 6/34 | (2006.01) |
| G11B 5/00 | (2006.01) |

(52) U.S. Cl.
CPC .............. *G11B 5/4866* (2013.01); *G02B 6/34* (2013.01); *G11B 2005/0021* (2013.01)

(58) Field of Classification Search
USPC .................. 369/13.32, 13.33, 13.13
See application file for complete search history.

(56) References Cited

U.S. PATENT DOCUMENTS

| 4,743,083 | A | 5/1988 | Schimpe |
| 6,016,290 | A | 1/2000 | Chen et al. |
| 6,018,441 | A | 1/2000 | Wu et al. |
| 6,025,978 | A | 2/2000 | Hoshi et al. |
| 6,025,988 | A | 2/2000 | Yan |
| 6,032,353 | A | 3/2000 | Hiner et al. |
| 6,033,532 | A | 3/2000 | Minami |
| 6,034,851 | A | 3/2000 | Zarouri et al. |
| 6,043,959 | A | 3/2000 | Crue et al. |
| 6,046,885 | A | 4/2000 | Aimonetti et al. |
| 6,049,650 | A | 4/2000 | Jerman et al. |
| 6,055,138 | A | 4/2000 | Shi |
| 6,058,094 | A | 5/2000 | Davis et al. |

(Continued)

OTHER PUBLICATIONS

M. Ams, et al., "Slit beam shaping method for femtosecond laser direct-write fabrication of symmetric waveguides in bulk glasses," Optical Society of America, Jul. 25, 2005, vol. 13, No. 15, pp. 1-6.

*Primary Examiner* — Tan X Dinh

(57) ABSTRACT

A focusing structure including an array of localized optical alterations that alter the propagation of light through the waveguide to diffractively focus the light as it exits the focusing structure. The array of optical alterations may be formed along either a straight or a curved line within a cross section of the focusing structure. In energy assisted magnetic recording apparatus a laser beam propagates through the waveguide to a near field transducer. The waveguide comprises a focusing element that includes an array of localized optical alterations that alter the propagation of the laser beam through the waveguide to diffractively focus the laser beam approximately at the near field transducer.

42 Claims, 9 Drawing Sheets

(56) References Cited

U.S. PATENT DOCUMENTS

| | | | |
|---|---|---|---|
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |

(56) References Cited

U.S. PATENT DOCUMENTS

| | | |
|---|---|---|
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,171,080 B2 | 1/2007 | Rausch |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,272,079 B2 | 9/2007 | Challener |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |

(56) References Cited

U.S. PATENT DOCUMENTS

| | | |
|---|---|---|
| 7,440,220 B1 | 10/2008 | Kang et al. |
| 7,440,660 B1 | 10/2008 | Jin et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,500,255 B2 | 3/2009 | Seigler et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,888,663 B2 | 2/2011 | Zhou et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,346,039 B2 | 1/2013 | Lu et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |

(56) References Cited

U.S. PATENT DOCUMENTS

| | | |
|---|---|---|
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2002/0003752 A1 | 1/2002 | Fuji et al. |
| 2005/0031278 A1 | 2/2005 | Shi et al. |
| 2009/0116804 A1* | 5/2009 | Peng et al. .............. 385/131 |
| 2010/0046083 A1 | 2/2010 | Peng |
| 2010/0290157 A1 | 11/2010 | Zhang et al. |
| 2011/0086240 A1 | 4/2011 | Xiang et al. |
| 2011/0090588 A1* | 4/2011 | Gao et al. ................ 360/59 |
| 2011/0157599 A1 | 6/2011 | Weaver et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0064051 A1* | 3/2013 | Peng et al. .............. 369/13.33 |
| 2013/0100783 A1* | 4/2013 | Ostrowski et al. ...... 369/13.33 |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0277575 A1* | 10/2013 | Peng et al. .............. 250/459.1 |
| 2013/0279035 A1* | 10/2013 | Peng et al. .............. 359/853 |
| 2014/0154529 A1 | 6/2014 | Yang et al. |
| 2014/0175050 A1 | 6/2014 | Zhang et al. |
| 2014/0254335 A1* | 9/2014 | Gage et al. .............. 369/13.33 |

\* cited by examiner

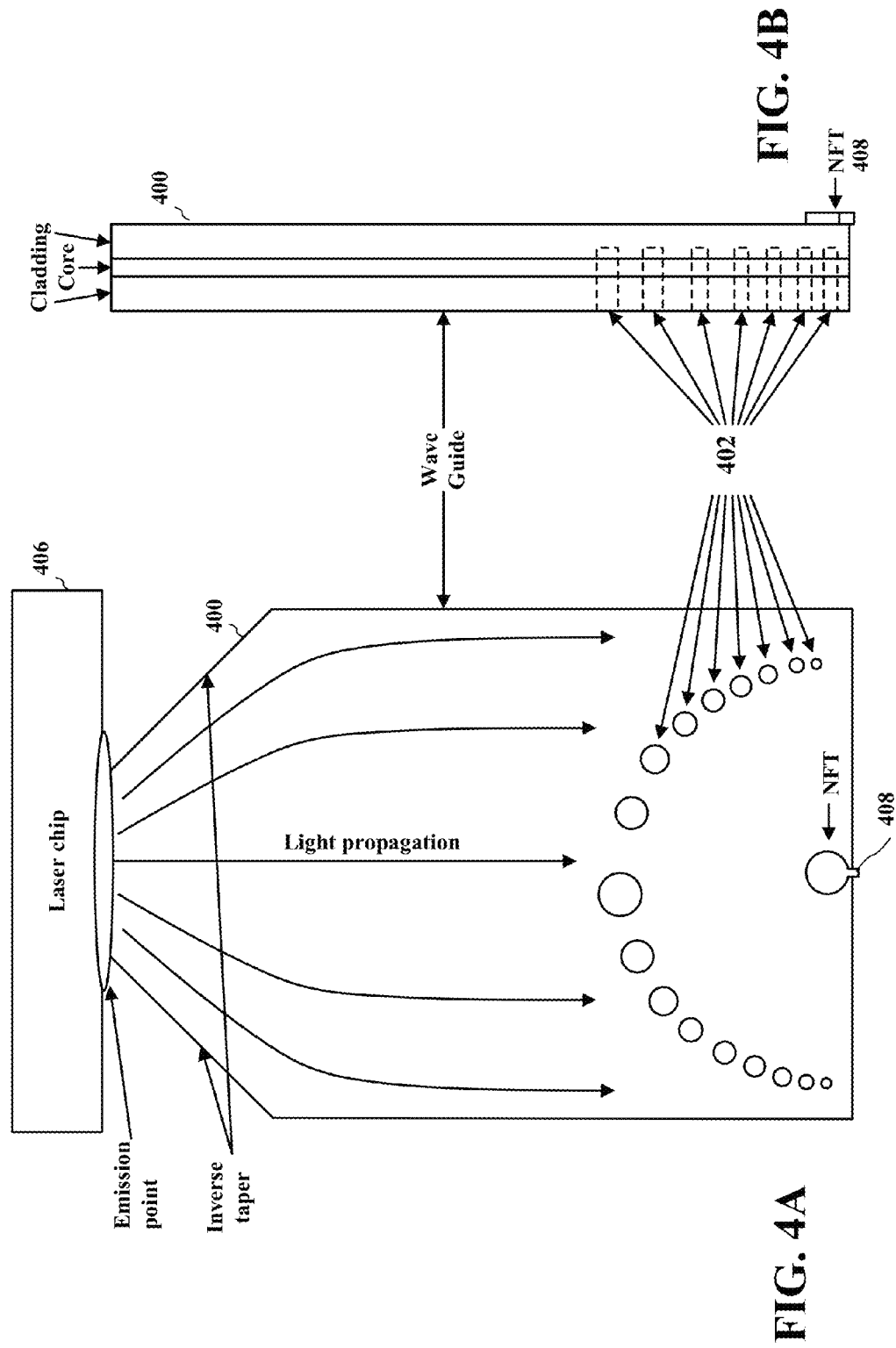

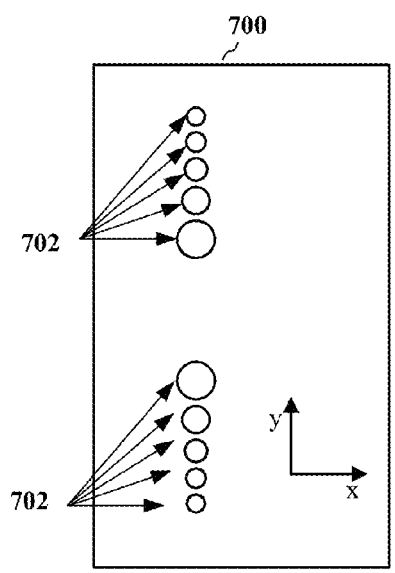 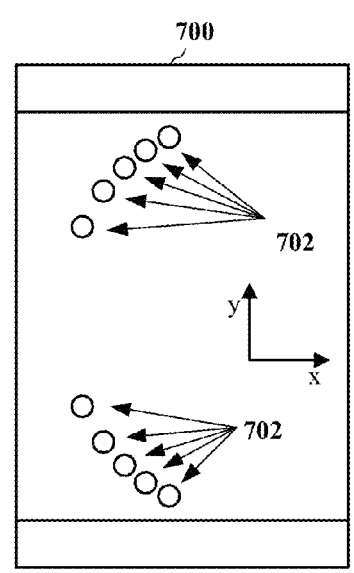
FIG. 7A  FIG. 7B

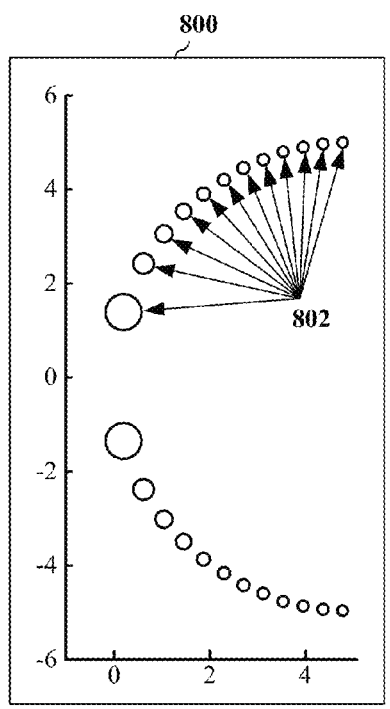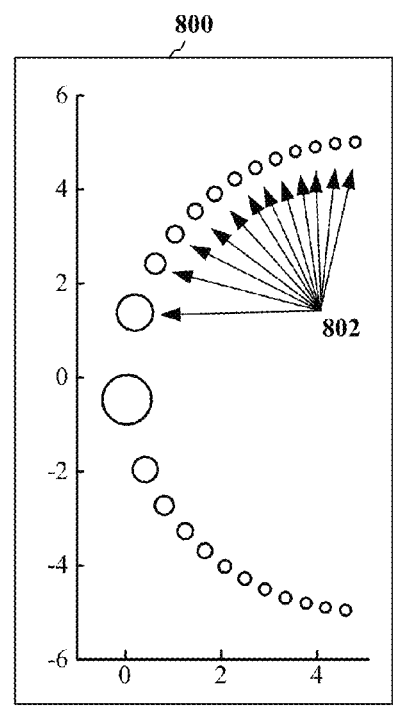
FIG. 8A  FIG. 8B

SYSTEM AND METHOD OF DIFFRACTIVE FOCUSING OF LIGHT IN A WAVEGUIDE

CROSS-REFERENCE TO RELATED APPLICATION(S)

This application claims the benefit of U.S. Provisional Application No. 61/953,564 entitled "System and Method of Diffractive Focusing of Light in a Waveguide of a Heat Assisted Magnetic Recording Head," filed on Mar. 14, 2014, which is expressly incorporated by reference herein in its entirety.

BACKGROUND

Information storage devices are used to retrieve and/or store data in computers and other consumer electronics devices. Energy assisted magnetic recording (EAMR) or heat assisted magnetic recording (HAMR) technology may be used to increase areal density (AD) of hard disks. A laser beam is delivered through an optical target waveguide and excites a near field transducer (NFT) at an air bearing surface (ABS) adjacent the magnetic disk surface. The NFT generates a very strong localized electromagnetic field. When the localized electromagnetic field is close enough to the magnetic recording medium, the recording medium absorbs part of the localized electromagnetic field and heats up in a region limited in part by the small dimension of the NFT. This heating lowers the coercivity of the magnetic medium locally and enables a write pole to magnetize the media with high density, which helps to realize the magnetic recording process with increased AD.

Various methods for focusing the laser to the NFT are known, such as mirror focusing. However, there are deficiencies with the known systems. For example, when using mirror focusing (e.g., parabolic solid immersion mirror), the focus tightness is limited.

There is a need in the art for improved focusing of a laser to an NFT in EAMR/HAMR technology.

BRIEF DESCRIPTION OF THE DRAWINGS

Various aspects of the present invention will now be presented in the detailed description by way of example, and not by way of limitation, with reference to the accompanying drawings, wherein:

FIGS. 4A and 4B show a front view of an example embodiment of a waveguide alongside a cross section view of the waveguide.

FIGS. 7A and 7B show cross sectional views of various example types of alterations in a waveguide.

FIGS. 8A and 8B show cross sectional views of example alterations in a waveguide.

DETAILED DESCRIPTION

Figure 1:
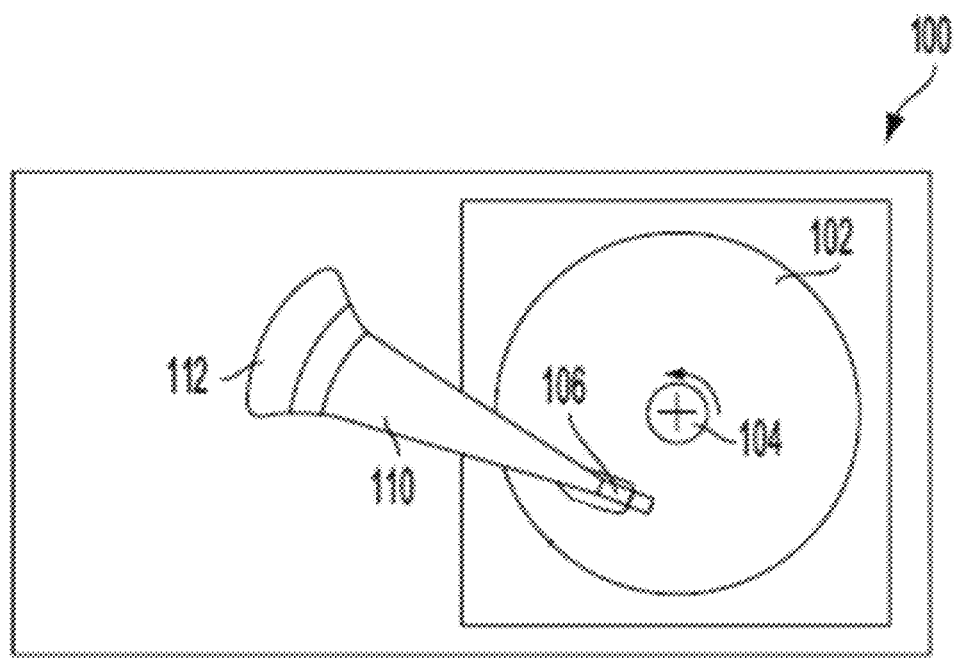
FIG. 1 is a conceptual plan view of an example of a HAMR disk drive, for use in accordance with aspects of the present invention.

In light of the above described problems and unmet needs, an improved focusing structure is presented herein. The focusing structure may be used in HAMR along with other potential applications, including microwave imaging, infrared and visible optics, far ultraviolet (UV) applications such as UV lithography, and X-ray focusing/imaging. The improved focusing structure ensures tight focusing while being easy to manufacture and maintaining compact dimensions.

Aspects of a focusing structure include a first end, a second end, and an optically altered portion between the first and second ends, wherein the optically alerted portion focuses light into one or more focal points or zones located toward the second end when light is incident from the first end. The altered portion comprises an array of localized optical alterations that alter the propagation of light through the focusing structure to diffractively focus the light as it exits the focusing structure, the array of optical alterations being formed along either a straight or a curved surface within a cross section of the focusing structure.

Aspects presented herein may be applied, e.g., in an HAMR waveguide having an entrance at a first end, a second end opposing the first end, and an optically altered portion located between the first and second ends. The optically altered portion forms a focusing element comprised in the waveguide. The optically altered portion may focus light into one or more focal points or zones located toward the second end, when light is incident from the first end. A near field transducer may be located at the one or more focal points. The focusing element includes an array of localized optical alterations that alter the propagation of the laser beam through the waveguide to diffractively focus the laser beam approximately at the near field transducer. The optical alterations may be formed along either a straight line or a curved line. The HAMR transducer may include a near field transducer located at the one or more focal points. The first surface of the HAMR transducer may be aligned to an air bearing surface (ABS) of the slider and the second surface of the HAMR transducer may be aligned to a surface of the slider opposite the ABS.

Additional advantages and novel features of these aspects will be set forth in part in the description that follows, and in part will become more apparent to those skilled in the art upon examination of the following or upon learning by practice of the invention.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus, method or article of manufacture does not require that all embodiments of the invention include the described components, structure, features, functionality, processes, advantages, benefits, or modes of operation.

FIG. 1 is a conceptual plan view of an example embodiment of a HAMR disk drive for use in accordance with aspects of the present invention. The HAMR drive disk 100 is shown with a rotatable magnetic disk 102. The magnetic disk 102 may be rotated on a spindle 104 by a disk drive motor located under the magnetic disk 102. A head may include read and write poles that detect and modify the magnetic polarization of the recording layer on the disk's surface. The head may generally be integrally formed with a slider 106. The function of the slider 106 may be to support the head and any electrical connections between the head and the rest of the HAMR disk drive 100. The slider 106 may be mounted to a positioner arm 110, which may be used to move the head on an arc across the rotating magnetic disk 102, thereby allowing the head to access the entire surface of the magnetic disk 102. The arm 110 may be moved using a voice coil actuator 112 or by some other suitable features and/or methods.

The slider 106 may be aerodynamically designed to fly above the magnetic disk 102 by virtue of an air bearing created between the surface of the slider 106 and the rotating magnetic disk 102. This surface of the slider 108 is also interchangeably referred to herein as an air bearing surface (ABS). The ABS may include the portion of the slider 106 surface that is closest to the rotating magnetic disk 102, which is typically, for example, the head. A HAMR transducer 214, as described in connection with FIGS. 2 and 3, may be coupled to the distal end of the slider 106 to assist writing data to the magnetic disk 102. The HAMR transducer 214 may include an NFT aligned with the ABS of the slider 106. Light from a laser may be coupled to the HAMR transducer 214 and guided by waveguide to the NFT. The NFT may focus (or concentrate) the light to the magnetic disk 102, and heat a small region of the media. The head may magnetically write data to the heated region of the media by energizing the write pole, for example. When the laser, as the heat source, is turned off, the localized magnetic media may cool, and the written bit may become thermally stable at ambient temperature.

Figure 2:
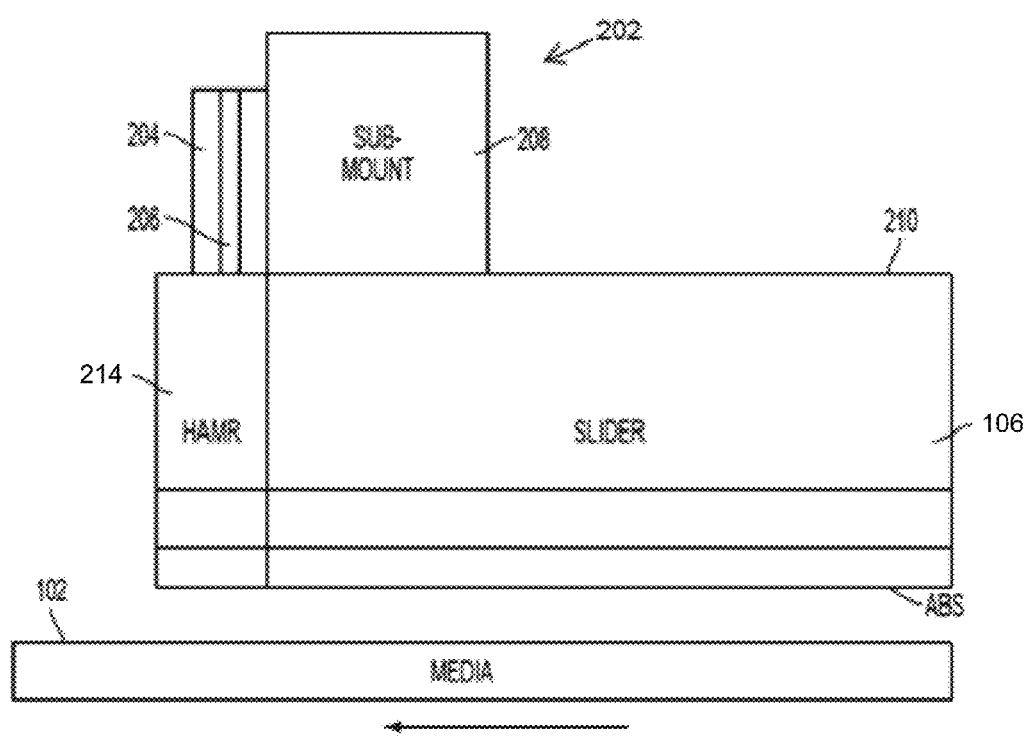
FIG. 2 is a conceptual elevation view of an embodiment of a slider with a HAMR transducer arranged with a light source.
Figure 3:
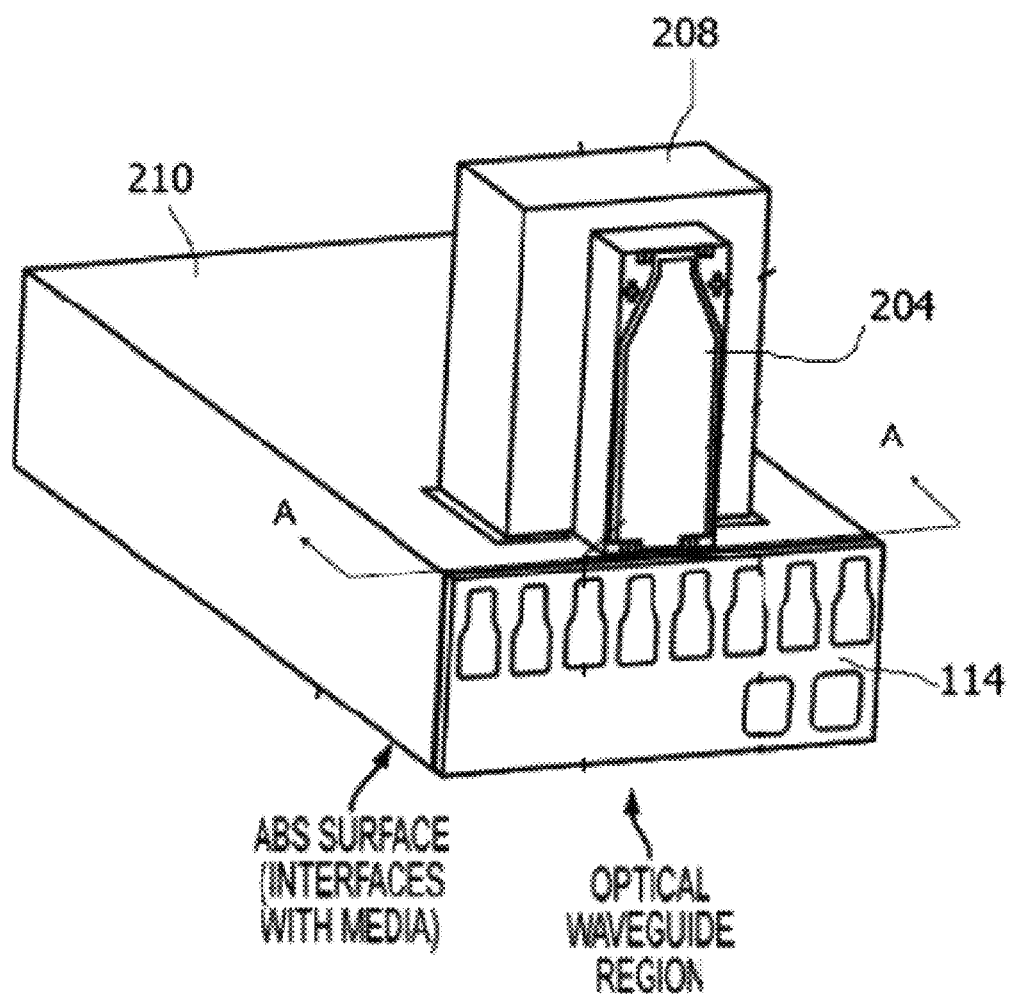
FIG. 3 is a conceptual perspective view of the example embodiment of the slider with the HAMR transducer arranged with the light source of FIG. 2.

FIG. 2 is a conceptual elevation view of an example embodiment of a slider with a HAMR transducer arranged with a light source. FIG. 3 is a perspective view of the example HAMR transducer 214 of FIG. 2, arranged with the light source 204 of FIG. 2. The HAMR disk drive 100 may include the magnetic disk 102, a subassembly 202, and a slider 106. A HAMR transducer 214 may be formed on the distal end of the slider 106. The subassembly 202 may include a light source, such as a laser diode 204 having an emission exit 206, attached to a submount 208. The slider 106 may have a back side 210 to which the submount 208 may be bonded. In the example shown, the back side 210 is opposite to the ABS. However, in other variations, the back side 210 (i.e., the side to which the submount 208 is bonded) may not be opposite to the ABS.

The HAMR transducer 214 may be mounted on a distal end of the slider 106 below the laser diode 204, such that a waveguide fabricated in the HAMR transducer 214 is aligned with the emission exit 206 of the laser diode 204. The HAMR transducer 214 may include a first surface aligned to the ABS of the slider 106 and second surface aligned to a surface of the slider 106 opposite the ABS.

An important aspect of waveguide applications, including HAMR-related waveguide applications is the ability to concentrate or focus light at a desired focal point. In HAMR applications, the desired focal point is the NFT.

Arrays of localized optical alterations in a waveguide may be used to concentrate light on (or redirect towards) a desired focal position. The desired focal position may be, e.g., the NFT for energy assisted magnetic recording applications. The alterations can be placed in the waveguides to block or alter the propagation of certain zones to ensure focusing at the desired position. The optical alterations may be spaced to form optically non-obstructing slits for producing one or more interferometric light energy patterns by phase coincidences. Such slits may be used to focus light into one or more focal points or zones located.

Thus, the waveguide may form alterations in the waveguide that diffractively focus the light similar to a zone plate. This can be beneficial in HAMR, e.g., because the use of coherent light enables the zones of desired phase to be well-defined.

The use of the optical alterations formed in the waveguide, as presented herein, offers a large numerical aperture while maintaining very compact dimensions. For example, in both Fresnel zone plates and Rayleigh-Wood plates, the resolution is comparable to the thickness of the last, e.g., thinnest, zone ring. In order to achieve a tight focus, e.g., a decent numerical aperture, very large plates containing hundreds of zones may be needed. The arrays of optical alterations in a waveguide described herein provide a desirable numerical aperture with compact dimensions.

Phase control and manufacturing are both simplified. For example, during manufacturing, certain portions of the waveguide altered, or spoiled, in order to achieve the focusing. The benefits can be obtained without the need for optical quality boundaries between different parts of the waveguide.

In HAMR, the NFT may be positioned adjacent to a magnetic recording medium, such that electromagnetic radiation emitted at the end of the NFT can be used to heat a portion of the recording medium. If the NFT is chosen with the correct dimensions, particularly the correct length, then it resonates with the incident light and creates extremely large electric fields in a recording medium in the vicinity of the end of the transducer.

Two example waveguides are shown in FIGS. 4A, 4B, 5A, 5B, and 5C, which are discussed below. FIGS. 4A and 4B show a front view (a) of an example waveguide 400 having optical alterations as described herein and a cross section view (b) of the waveguide. As shown in FIG. 4A, the waveguide may be an inverse taper waveguide, e.g., the waveguide at the input port may be smaller than in the case of a forward taper waveguide, and expand away from the input port. The waveguide may include a plurality of spaced alterations 402 in a particular pattern. The array of localized optical alterations 402 may be part of a focusing element to diffractively focus the laser beam emitted, e.g., from laser chip 406, approximately at near field transducer 408.

As shown in FIGS. 4A and 4B, the alterations may be in the form of holes or other openings formed in the waveguide, and may be filled with a different material than the material of the waveguide. However, as discussed in further detail below, the alterations may be in the form of any suitable structure or other feature that creates relatively opaque zones that allow light to diffract around the relatively opaque zones. The waveguide may include a core layer sandwiched between two cladding layers. The laser may be emitted from a laser. The NFT may be positioned at or near the end of the waveguide.

As shown in FIG. 4A, the alterations may be positioned along a curved line. The curved line may be a parabolic fashion. Additionally, the size of the openings/alterations may be similar or may differ, e.g., with the largest alterations being positioned nearer the center of the waveguide. The alterations may decrease in size along the semicircle path toward the end of the waveguide, with the smallest alterations being located adjacent the end of waveguides. Furthermore, the distance between adjacent alterations may decrease along the semicircle path toward the end of the waveguide. For example, the distance between the two alterations closet to the end of the waveguide may be about $\frac{1}{5}^{th}$ or greater the distance between the two alterations closest to the center of the waveguide, for the size of the waveguide shown in FIG. 4A. The particular position and location of the alterations may be selected so as to optimize the diffractive focus of the laser and reduce lithography requirements. The localized alterations may block or alter the propagation of certain zones so as to ensure focusing at the desired position. For example, the alterations shown in FIGS. 4A and 4B may lie on a semicircle in a phase-offset curved diffractive array. For example, holes, openings or other alterations may be formed in locations determined or otherwise identified to produce a desired focus or other effect. The openings may be formed using different methods depending on the application. For example, openings forming a focusing element for use in HAMR may be lithographically formed, e.g., etched. A microwave focusing element may be drilled.

The array of optical alterations in the waveguide may be used in combination with other focusing elements. Thus, the waveguide may comprise at least one additional focusing element or aspect. Fiber/waveguide tapering may be used as an additional focusing aspect, as illustrated in FIG. 4A. Focusing lenses and/or focusing mirrors may also be used in combination with the array of optical alterations in order to further assist in focusing the light.

Figures 5A, 5B, 5C:
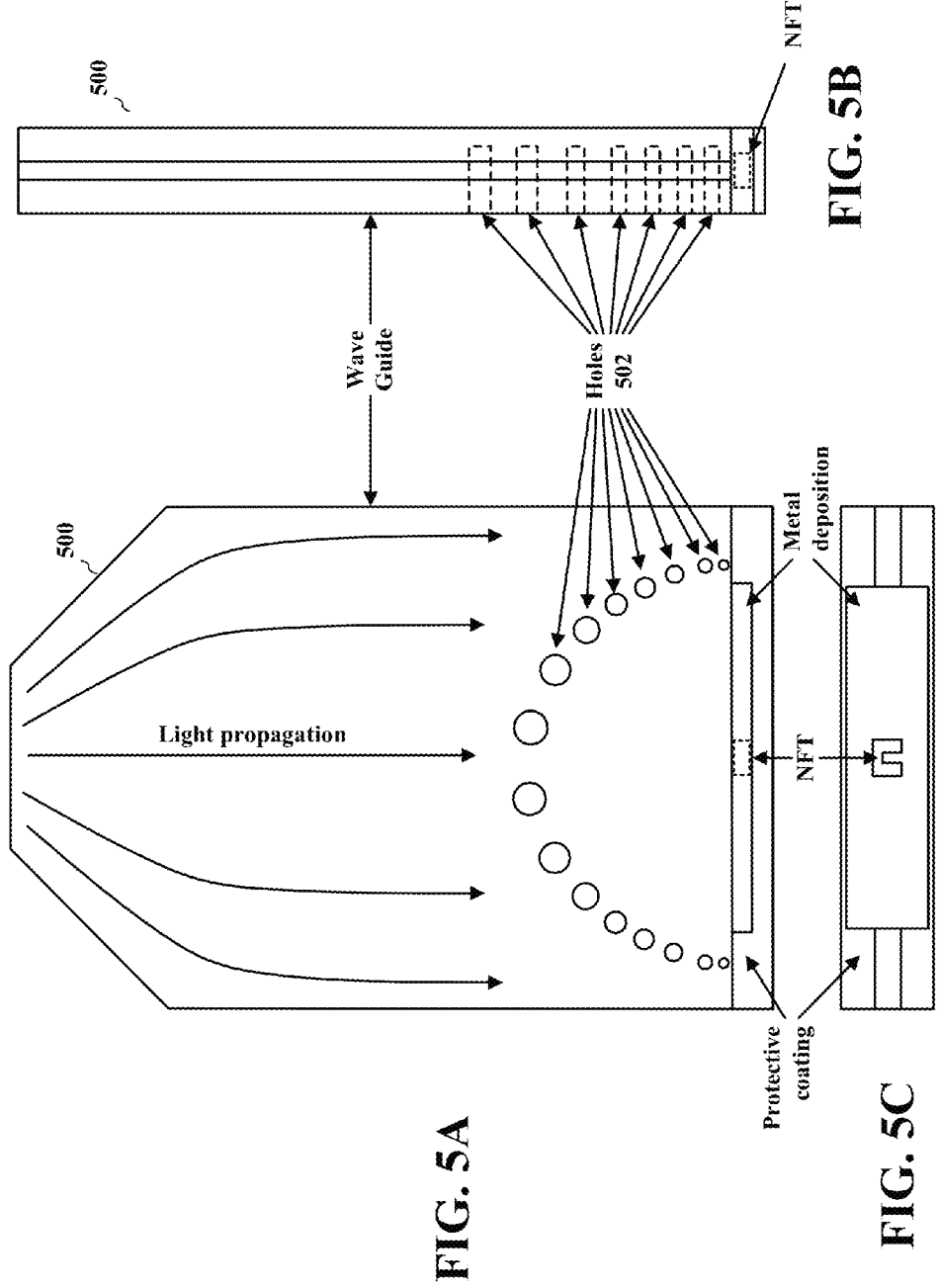
FIGS. 5A, 5B, and 5C show a front view of another example of a waveguide alongside a cross section view of the waveguide.

FIGS. 5A, 5B, and 5C show another example of a wave guide 500 with alterations 502 for producing diffractive focus or other similar effect. As shown in FIGS. 5A, 5B, and 5C the alterations lie on a semicircle in the appropriate zones. FIG. 5B illustrates a side view of the waveguide 500, which shows the alterations 502 extending through cladding and core layers of the waveguide. FIG. 5C illustrates a view of the waveguide from the side at which the NFT is located. In the waveguide of FIGS. 5A, 5B, and 5C, the NFT is positioned in front of the waveguide and is coated with a metal deposit and a protective coating.

Figure 6A:
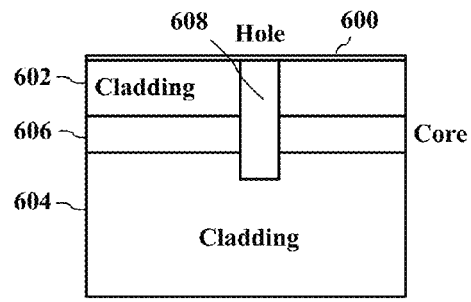
FIGS. 6A, 6B, 6C, 6D, 6E, and 6F show a front view of further example embodiments of an effect pattern for a waveguide.

FIGS. 6A-6F show various examples of the alterations described in connection with FIGS. 4A, 4B, and 5A, 5B, and 5C. The waveguide may comprise, e.g., a first cladding layer 602, a second cladding layer 604, and a core layer 606 provided between the first and second cladding layers. FIG. 6A shows an example where the alteration 608 is a hole or other opening, for example, passing through the one of the cladding layers 602, through the core layer 606, and into another cladding layer 604. The hole or opening 608 may be lithographically formed, e.g., etched, into the waveguide 600. When a hole is used for the alteration 608 (e.g., a hole that is not filled with another material), the alteration may block the wave propagation.

Figure 6B:
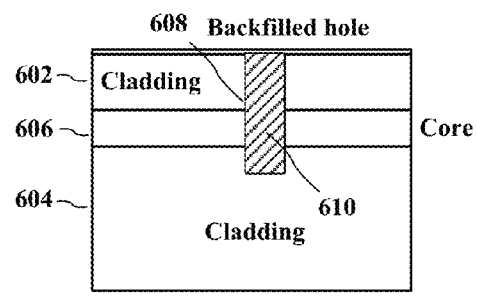

FIG. 6B shows an example where the alteration includes a hole or other opening 608 similar to FIG. 6A, except that the hole or other opening is filled with a material 610. For example the hole, or other opening, may be backfilled with cladding material or another dielectric material having an appropriate refraction index. Alternately, the opening may be backfilled with a reflective material, such as a metal, such that the backfilled material reflects or absorbs light in the undesired zones. When a backfilled hole 610, 612 is used for the alteration (e.g., a hole that is filled with a cladding material), the alteration may change the phase of the wave propagation. In other words, the backfilled hole may change the effective index of refraction.

Figure 6C:
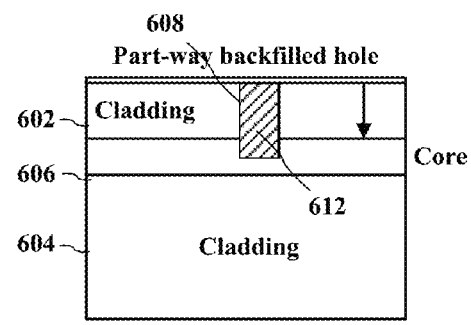

FIG. 6C shows an example where the alteration includes a hole or other opening 608 similar to FIG. 6B, except that the backfilled hole 612 or other opening only extends through one of the cladding layers 602 and only partly through the core layer 606.

Figure 6D:
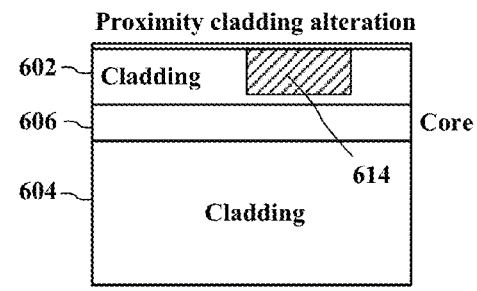

FIG. 6D shows an example an example where the alteration 614 is present in one of the cladding layers and does not contact the core layer. In this case, the change of the zone propagation may be induced by proximity effect, for example. Specifically, the effective index of refraction in the waveguide may depend on cladding properties, as well as on core structure, for example. The index of refraction change caused by the alteration as shown in FIG. 6D may be slight, so the cladding alteration may therefore be extended in the direction of the desired wave propagation to ensure appropriate phase accumulation.

Figure 6E:
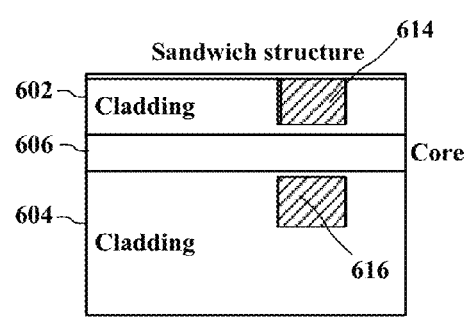

FIG. 6E shows an example similar to the alteration of FIG. 6D, except that the alteration 614, 616 is present in both of the cladding layers sandwiching the core layer, without the alteration contacting the core layer. The alteration of FIG. 6E may increase the proximity effect as compared to the alteration of FIG. 6D, for example. Since the core 606 is unaffected, in the alterations of FIGS. 6D and 6E, low reflection and therefore high efficiency of focusing may be achieved.

Figure 6F:
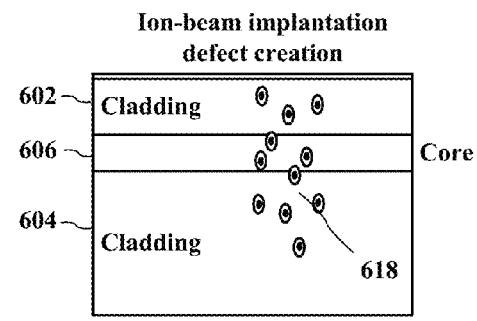

FIG. 6F shows an example embodiment where the alteration 618 is formed by ion bombardment/implantation of the waveguide 600. This alteration 618 may decrease or completely eliminate propagation of the zones that do not enhance focus or other similar desired effects. The alteration of FIG. 6F may be formed by directing a high energy ion beam into the area where it is desired to change the properties of the material (e.g., the index of refraction). The ion beam destroys or spoils the lattice of cladding and/or core. And then, ions trapped in the crystalline layers may grow back into tiny crystals. Any method that provides this change in result may be used.

Each of the various types of alterations shown in FIG. 6A-6F may be implemented independently or in combination with one or more of the others. For example, a part-way hole or other opening alteration may be used atop a buried proximity layer alteration. In another example, offset (e.g., top to bottom) may sandwich one or more structures (proximity or part-way protruding features).

FIGS. 7A and 7B show example patterns of alterations 702 for a waveguide. FIG. 7A shows alterations 702 positioned approximately along a straight line within a cross section of the waveguide 700. FIG. 7B shows alterations 702 positioned approximately along a curved surface within a cross section of the waveguide 700. The curved line along which the optical alterations extend may be semi-circular or parabolic. The placement along the curved surface enables the alterations to be spaced further apart while limiting the lateral dimensions of the waveguide and the number of holes. Although the optical alterations 702 are shown having a circular shape, the alterations 702 may also be formed as an elliptical shape.

As illustrated in FIG. 7B, the optical alterations may comprise a rounded shape of approximately the same size. As illustrated in FIG. 7A, the cross sections of the optical alterations may differ in size. For example, cross sections of the optical alterations may comprise rounded shapes of differing sizes that lessen in size, e.g., diameter, as they extend from a center of the array to an outer portion.

FIGS. 8A and 8B illustrate additional aspects of patterns of alterations 802 for a waveguide 800. In FIG. 8A, the optical alterations are disposed on two sides of an optical axis, e.g., shown having "0" at its center. In FIG. 8A, the two sides are disposed approximately evenly on either side of the optical axis. In contrast, in FIG. 8B, the optical alterations on the two sides of the optical axis are shifted relative to each other. Such shifting may be used in order to achieve a desired polarization of the light at the desired focal position. For example, the optical alterations 802 may be located along a curved line in undesired zones. As illustrated, the alterations may be rounded openings placed at the undesired zones between neutral points for producing focus or other similar effects (e.g., p/2 and 3p/2 phase delay).

Figure 9:
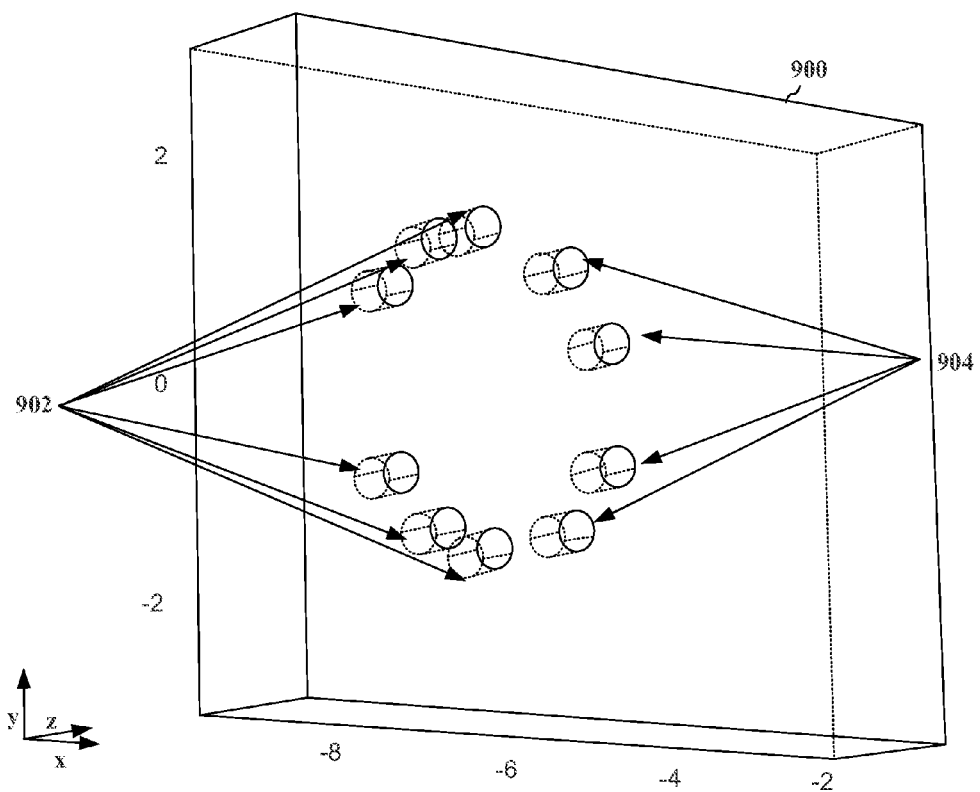
FIG. 9 is a perspective view of another example embodiment of a waveguide.

The focusing element formed using the optical alterations may be used as a single focusing element or in combination with other focusing elements, e.g., in order to form a compound lens. For example, the optical alterations may be configured to include multiple curved lines of alterations extending within a cross section of a waveguide. FIG. 9 is a perspective view of one example waveguide having arrays of optical alterations 902, 904 that formed along multiple curved surfaces extending within a cross section of a waveguide 900, e.g., along first curved line 902 comprising a convex shape and along a second curved line 904 having a concave shape. Although FIG. 9 illustrates an example, having six alterations along the concave line and six alterations along the convex line, the number and size of the alterations may be selected depending on the application. The focusing element may also be used in combination with other focusing means, such as lenses, mirrors, tapering, etc.

FIG. 9 shows focusing properties of a semi-circular alteration arrangement containing six alterations of equal diameter on each side of the optical axis, thus providing twelve alterations. The alterations may be holes backfilled with cladding material. The waveguide may have a core with an index of 2 and a cladding index of 1.4. As shown in FIG. 9, the first six alterations have a convex semi-circle pattern, followed by the second six alterations that have a concave semi-circle pattern. In FIG. 9, light propagates from left to right (i.e., along the x-axis). In this manner, the waveguide of FIG. 9 is analogous to a compound lens.

FIGS. 4-8 illustrate a flat cross section of a waveguide, which shows the optical alterations having a rounded shape. FIG. 9 illustrates a view showing that such optical alterations may comprise a substantially cylindrical shape within the waveguide 900, Although the aspects presented herein have been described using the example of an HAMR-related waveguide, the aspects presented herein can be used in focusing structures for additional applications. For example, the optical alterations described in connection with FIGS. 4-9 may be used for any focusing structure. Conventional Fresnel-style or Rayleigh-Wood "zone plates" are provided along a straight line/plane. In contrast, by providing the array of optical alterations along a curved surface within a cross section of a focusing structure enables extremely fine focusing substantially without side lobes/maxima. Among others, such potential applications include microwave imaging, infrared and visible optics, far UV applications such as UV lithography, and X-ray focusing/imaging.

The various example embodiments are provided to enable one of ordinary skill in the art to practice various aspects of the present invention. Modifications to example embodiments presented throughout this disclosure will be readily apparent to those skilled in the art, and the concepts disclosed herein may be extended to other devices. All structural and functional equivalents to the various components of the example embodiments described throughout this disclosure that are known or later come to be known to those of ordinary skill in the art are expressly incorporated herein by reference.

The invention claimed is:

1. An energy assisted magnetic recording apparatus comprising:
a waveguide;
a near field transducer excited by a laser beam received through the waveguide,
a focusing element comprised in the waveguide, the focusing element including:
an array of localized optical alterations that alter the propagation of the laser beam through the waveguide to diffractively focus the laser beam approximately at the near field transducer, the localized alterations in the array spaced by unaltered portions of the waveguide,
wherein the laser beam propagates through the array of localized optical alterations in a direction toward the near field transducer such that a portion of the laser beam is transmitted through the optical alterations and a different portion of the laser beam is transmitted through the unaltered portion of the waveguide in the direction toward the near field transducer.

2. An energy assisted magnetic recording apparatus comprising:
a waveguide;
a near field transducer excited by a laser beam received through the waveguide,
a focusing element comprised in the waveguide, the focusing element including:
an array of localized optical alterations that alter the propagation of the laser beam through the waveguide to diffractively focus the laser beam approximately at the near field transducer, wherein each of the optical alterations comprises an opening formed in the waveguide.

3. An energy assisted magnetic recording apparatus comprising:
a waveguide;
a near field transducer excited by a laser beam received through the waveguide,
a focusing element comprised in the waveguide, the focusing element including:
an array of localized optical alterations that alter the propagation of the laser beam through the waveguide to diffractively focus the laser beam approximately at the near field transducer, wherein the waveguide comprises a first material and each of the optical alterations comprises an opening backfilled with a second material.

4. The apparatus of claim 1, wherein each of the optical alterations comprises an adjustment to the waveguide material.

5. An energy assisted magnetic recording apparatus comprising:
waveguide;
a near field transducer excited by a laser beam received through the waveguide,
a focusing element comprised in the waveguide, the focusing element including:
an array of localized optical alterations that alter the propagation of the laser beam through the waveguide to diffractively focus the laser beam approximately at the near field transducer, wherein each of the optical alterations comprises an adjustment to the waveguide material, and the adjustment comprises at least one of ion beam implantation and chemical defect creation.

6. The apparatus of claim 1, wherein each of the optical alterations extend into a first cladding layer of the waveguide.

7. The apparatus of claim 6, wherein each of the optical alterations extend into the first cladding layer and a core layer of the waveguide.

8. The apparatus of claim 6, wherein each of the optical alterations extend into the first cladding layer and a second cladding layer.

9. The apparatus of claim 8, wherein each of the optical alterations extend into the first cladding layer, the second cladding layer, and a core layer.

10. The apparatus of claim 8, wherein each of the optical alterations extend into the first cladding layer and the second cladding layer without extending into the core layer.

11. The apparatus of claim 1, wherein each of the optical alterations comprises a rounded shape formed in the waveguide.

12. The apparatus of claim 11, wherein each of the optical alterations comprises one of a circular shape and an elliptical shape.

13. The apparatus of claim 11, wherein the alterations are disposed on two sides of an optical axis and are shifted with respect to each other.

14. The apparatus of claim 11, wherein a cross section of the array of optical alterations extends approximately along a straight line within a cross section of the waveguide.

15. The apparatus of claim 11, wherein the array of optical alterations is formed along a curved line within a cross section of the waveguide.

16. The apparatus of claim 11, wherein a cross section of the arrays of optical alterations comprise multiple curved lines extending within a cross section of the waveguide.

17. An energy assisted magnetic recording apparatus comprising:
a waveguide;
a near field transducer excited by a laser beam received through the waveguide,
a focusing element comprised in the waveguide, the focusing element including:
an array of localized optical alterations that alter the propagation of the laser beam through the waveguide to diffractively focus the laser beam approximately at the near field transducer,
wherein each of the optical alterations comprises a rounded shape formed in the waveguide,
wherein a cross section of the arrays of optical alterations comprise multiple curved lines extending within a cross section of the waveguide, and
wherein a first curved line comprises a convex shape and a second curved line comprises a concave shape.

18. The apparatus of claim 11, wherein a cross section of each of the optical alterations comprises a rounded shape of approximately the same size.

19. The apparatus of claim 11, wherein cross sections of the optical alterations comprise rounded shapes of differing sizes.

20. The apparatus of claim 19, wherein the rounded shapes of the alterations lessen in size as they extend from the center of the array to an outer portion.

21. The apparatus of claim 11, wherein the waveguide comprises at least one additional focusing element.

22. The apparatus of claim 21, wherein the additional focusing element comprises at least one from a group consisting of a taper, a lens and a mirror.

23. A focusing structure comprising:
an array of localized optical alterations that alter the propagation of light through the focusing structure to diffractively focus the light as it exits the focusing structure,
wherein the array of optical alterations is formed along a curved surface within a cross section of the focusing structure, the localized alterations in the array spaced by unaltered portions of the focusing structure,
wherein the light propagates through the array of localized optical alterations, a portion of the light being transmitted through the optical alterations and a different portion of the light being transmitted through the unaltered portion of the focusing structure.

24. The apparatus of claim 23, wherein each of the optical alterations comprises a rounded shape formed in the focusing structure.

25. The apparatus of claim 24, wherein each of the optical alterations comprises one of a circular shape and an elliptical shape.

26. A focusing structure comprising:
an array of localized optical alterations that alter the propagation of light through the focusing structure to diffractively focus the light as it exits the focusing structure, wherein the focusing structure comprises a first material and each of the optical alterations comprises an opening backfilled with a second material, and
wherein the array of optical alterations is formed along a curved surface within a cross section of the focusing structure.

27. The apparatus of claim 23, wherein each of the optical alterations comprises an adjustment to the focusing structure material.

28. A focusing structure comprising:
an array of localized optical alterations that alter the propagation of light through the focusing structure to diffractively focus the light as it exits the focusing structure, wherein the adjustment comprises at least one of ion beam implantation and chemical defect creation, and
wherein the array of optical alterations is formed along a curved surface within a cross section of the focusing structure.

29. The apparatus of claim 23, wherein the focusing structure comprises:
a first cladding layer;
a core layer; and
a second cladding layer,
wherein each of the optical alterations extend into the first cladding layer of the focusing structure.

30. The apparatus of claim 29, wherein each of the optical alterations extend into the first cladding layer and the core layer.

31. The apparatus of claim 29, wherein each of the optical alterations extend into the first cladding layer and the second cladding layer.

32. The apparatus of claim 31, wherein each of the optical alterations extend into the first cladding layer, the second cladding layer, and the core layer.

33. The apparatus of claim 31, wherein each of the optical alterations extend into the first cladding layer and the second cladding layer without extending into the core layer.

34. The apparatus of claim 23, wherein a cross section of each of the optical alterations comprises a rounded shape of approximately the same size.

35. The apparatus of claim 23, wherein cross sections of the optical alterations comprise rounded shapes of differing sizes.

36. The apparatus of claim 35, wherein the rounded shapes of the alterations lessen in size as they extend from the center of the array to an outer portion.

37. The apparatus of claim 23, wherein the alterations are disposed on two sides of an optical axis and are shifted with respect to each other.

38. The apparatus of claim 23, wherein a cross section of the arrays of optical alterations comprise multiple curved surfaces extending within a cross section of the focusing structure.

39. A focusing structure comprising:
an array of localized optical alterations that alter the propagation of light through the focusing structure to diffractively focus the light as it exits the focusing structure, wherein the array of optical alterations is formed along a curved surface within a cross section of the focusing structure, wherein a cross section of the arrays of optical alterations comprise multiple curved surfaces extending within a cross section of the focusing structure, and wherein a first curved surface comprises a convex shape and a second curved surface comprises a concave shape.

40. The apparatus of claim 23, wherein the focusing structure comprises at least one additional focusing element.

41. The apparatus of claim 40, wherein the additional focusing element comprises at least one from a group consisting of a taper, a lens and a mirror.

42. A focusing structure comprising:

an array of localized optical alterations that alter the propagation of light through the focusing structure to diffractively focus the light as it exits the focusing structure, wherein each of the optical alterations comprises an opening formed in the focusing structure, wherein the array of optical alterations is formed along a curved surface within a cross section of the focusing structure.

* * * * *